June 18, 1935.  P. O. DERRINGER  2,005,364
TOASTER CONSTRUCTION
Filed March 2, 1933
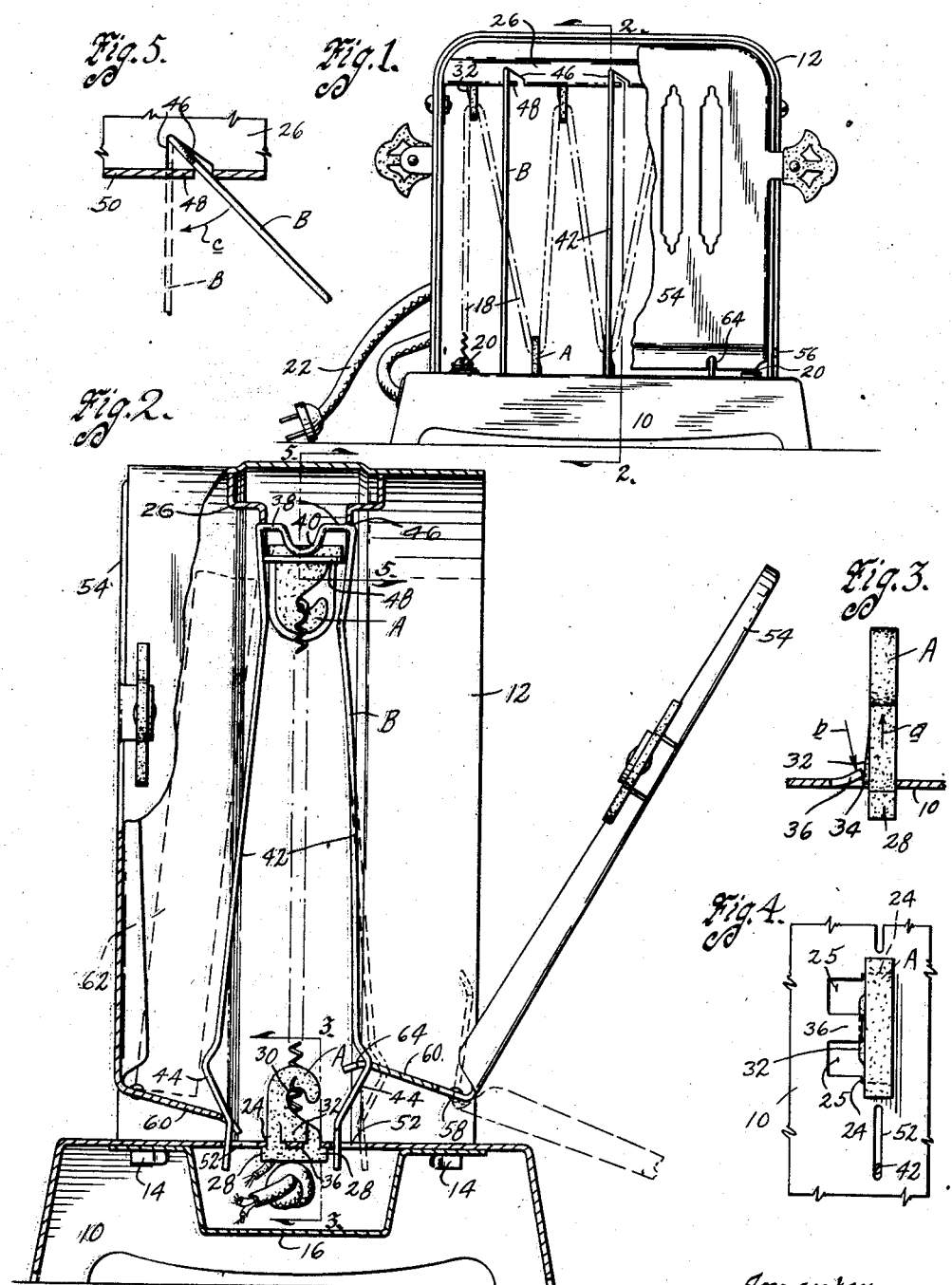
Inventor
Percy O. Derringer
by Bair, Freeman & Sinclair
Attorneys
Witness
H. S. Munzenmaier Patented June 18, 1935

2,005,364

UNITED STATES PATENT OFFICE 2,005,364

TOASTER CONSTRUCTION

Percy O. Derringer, Belleville, Ill., assignor to Knapp-Monarch Company, Belleville, Ill., a corporation of Missouri Application March 2, 1933, Serial No. 659,364

11 Claims. (Cl. 219—19)

The object of my invention is to provide a toaster construction which is simple, durable and comparatively inexpensive to manufacture.

A further object is to provide a toaster construction in which novel insulating supports are provided for supporting the resistance or heating element relative to the metal frame of the toaster.

Still a further object is to provide heating element supports which can be easily assembled relative to a toaster or other electric appliance frame by pushing the supports through openings in the frame, a novel means being provided to retain them therein against undesired movement after once being assembled.

More particularly, it is my object to provide a heating element support which can be thrust through an opening of a frame or other support and has a head on one side of the frame and lug means on the other side coacting with lug means on the frame to retain the heating element support in position after it is once assembled.

Still a further object is to provide a toaster construction having a novel grid wire arrangement and a novel means for supporting the grid wire relative to the frame of the toaster so that parts of it are under tension and so that it can be utilized as a spring for coaction with bread supports.

Still a further object is to provide cam portions on the grid wires and to anchor the wires in slots so that they can move in one plane to secure the action desired for resiliently tending to retain the bread supports in their bread supporting positions.

With these and other objects in view my invention consists in the construction, arrangement and combination of the various parts of my device, whereby the objects contemplated are attained as hereinafter more fully set forth, pointed out in my claims, and illustrated in the accompanying drawing, in which:

Figure 1 is a side elevation of a toaster construction embodying my invention showing a portion of one of the doors or bread supports removed therefrom.

Figure 2 is an enlarged sectional view on the line 2—2 of Figure 1 showing the heating element supports, the grid wires, the frame and the bread supports in their relation to each other.

Figure 3 is an enlarged sectional view on the line 3—3 of Figure 2 showing a heating element supporting member being inserted.

Figure 4 is a plan view of Figure 3; and

Figure 5 is an enlarged sectional view on the line 5—5 of Figure 2 showing a grid wire being assembled.

On the accompanying drawing, I have used the reference numeral 10 to indicate generally a base and 12 a casing, which when assembled together constitute a frame of a toaster. The parts 10 and 12 are held assembled relative to each other by bendable ears 14 extending downwardly from the casing 12 and through openings in the base 10. A terminal cover plate 16 is also held in position by the ears 14.

Within the casing 12 I provide a heating element 18 having its ends connected with terminals 20. A supply cord 22 extends into the base 10 and is connected with the terminals 20. The heating element 18 intermediate its ends is supported by heating element supporting members A. Each member A is formed of insulating material, such as Lavite or the like and is adapted to extend through an opening 24 in the base 10 or a similar opening 24 in a frame member 26.

To prevent too far an extension of the member A through the opening 24, the member is provided with projections 28 which may be termed a head for the member. The opening 24, as shown best in Figure 4, is rectangular and so is the cross section of the member A. This prevents any undesired turning of the member relative to the opening through which it extends. I do not wish, however, to confine myself to the particular shape illustrated as any other-than-round shape would accomplish the same result.

Each member A is provided with a notch 30 for the heating element 18 to extend through. The heating element can be under tension so as to keep the heads 28 against the base 10 and the frame member 26, but to insure that they are so kept in position, especially when the heating element expands by being energized with electricity, I provide the following structural details.

Each member A is provided with a tapered lug 32 terminating in a shoulder 34. Each opening 24 is enlarged as indicated at 25 (see Figure 4) and between these enlargements, a lug or tongue 36 is provided.

During assembly, as shown in Figure 3, the member A may be pushed upwardly, as indicated by the arrow $a$, until the head 28 engages the base 10, or the frame member 26, as the case may be. The tongue 36 is then pressed downwardly, as indicated by the arrow $b$, so that it will spring under the shoulder 34 and assume the position illustrated in Figure 2. In this position it tends to force the member A in the direction of its insertion for thus holding the projections 28 against the base or frame member. Thus the heating element 18 need not be depended on in any degree to retain the member A in its proper position relative to the opening 24.

In my toaster construction, I provide grid wires B substantially U-shaped in formation. Their specific shape is shown in Figure 2 and each consists of a cross bar 38 forming a pivotal portion, the cross bar having a depressed portion 40 and in addition to the cross bar, the grid wire B has a pair of arms 42. Each arm is provided with a cam portion 44.

The frame member 26 is provided with a notch 46 for each grid wire B. The general axis of the notch is at an angle relative to the assembled vertical position of the grid wire. During assembly the grid wire is inserted as shown by dotted lines in Figure 5 and thereafter it is swung to the dotted line assembled position, causing the portions 38 to act as pivot portions in the apex of the notch 46 and the depressed portion 40 to engage a lip 48 formed of a web 50 of the frame member 26. By referring to Figure 2 it will be noted that the frame member is generally channel shaped in cross section so that there are two pivot points for the cross bar 38 and the lip 48 forms a single contact point for the depressed portion 40.

The arms 42 engage the sides of the lip 48, as shown in Figure 2, thus tending to keep the arms spread as the left one is illustrated, the right one being so illustrated in dotted lines. The lower terminal ends of the arms 42 extend through slots 52 of the base 10 and are thus subject to lateral movement, their original shape and the lip 48 being such as to constrain them toward the outer ends of the slots.

Doors or bread supports 54 are provided with ears 56 extending through perforations 58 in the casing 12 whereby the bread supports are hingedly connected to the toaster frame. The supports 54 have supporting flanges 60 for a slice of bread 62 shown by dotted lines in Figure 2. The flanges 60 engage the cam portions 44 of the grid wires B, notches 64 being provided in the flanges for the grid wires.

Due to the angle of the cam portion 44 relative to the flange 60 and the resilient tendency for the grid wire to spring outwardly, all in relation to the hinge at 56—58, after the bread support is swung to a position nearly closed the cam portion 44 will tend to swing the flange 60 downwardly and thus retain the bread support in its bread supporting position. Thus the grid wires serve also the purpose of keeping the bread supports in such position.

The members A and B can be made in various shapes and other changes may be made without departing from the real spirit and purpose of my invention, and it is my intention to cover by my claims, any modified forms of structure or use of mechanical equivalents, which may be reasonably included within their scope.

I claim as my invention:

1. In a toaster construction, a frame having an opening therein, a heating element supporting member extending through said opening, said heating element supporting member having a head on one side of said frame and having means on the other side thereof to coact with a heating element, a heating element coacting therewith and supported thereby, a tapered shoulder on said member and a resilient lug on said frame at the edge of said opening to snap past said shoulder and thereby retain said member in said opening.

2. In a toaster construction, a frame having an opening therein, a heating element supporting member extending through said opening, said heating element supporting member having a head on one side of said frame and having means on the other side thereof to coact with a heating element, a heating element coacting therewith and supported thereby and means comprising a resilient lug on said frame at the edge of said opening and a shoulder on said member to snap past said lug to retain said member in said opening.

3. In a toaster construction, a frame having an opening therein, a heating element supporting member extending through said opening, said heating element supporting member having a head on one side of said frame and having means on the other side thereof to coact with a heating element, a heating element coacting therewith and supported thereby and means comprising a lug on said frame at the edge of said opening and a tapered projection on said member to coact with said lug to retain said member in said opening.

4. In a toaster construction, a frame having an opening therein, a heating element supporting member extending through said opening having a head on one side of said frame and a means on the other side of said frame to engage a heating element and means comprising a lug on said frame at the edge of said opening and a tapered projection on said member to coact with said lug to retain said member in said opening.

5. In a device of the class described, a support having an opening therein, a headed heating element supporting member of a cross sectional shape permitting extension of said member through such opening with the exception of the head thereof, a heating element coacting with the portion of said member on the side of said support opposite said head and means to retain said member in position against retraction relative to said support comprising an abutment on the portion of said member extended through said opening and a lug on said support which is bendable to permit said abutment to pass by it during extension of the member through said opening and engageable with said abutment to prevent retraction of said head from said support in the mounted position of said member.

6. In a toaster construction, a frame and grid wires supported relative thereto, said grid wires each having a curved cross bar, said frame having for each grid wire a notch to receive said cross bar when said grid wires are at an angle relative to assembled position, said frame also having a pair of portions to engage spaced points of each cross bar and having an intermediate portion to engage the curved part of each cross bar when said grid wires are swung to assembled position, said curved parts being placed under stress by said last portions when said grid wires are in assembled position.

7. In a toaster construction, a channel shaped frame and a grid wire supported relative thereto, said grid wire having a lateral member extending through and pivotally coacting with the flanges of said frame, a portion of said lateral member being bent out of alinement with the pivotal axis thereof and engaging the web of said frame under stress when said grid wire is pivoted about said lateral member to assembled position relative to said frame.

8. In a toaster construction, a channel shaped frame and a grid wire supported relative thereto, said grid wire being U-shaped and thereby having arms and a lateral member constituting a connecting member, the intermediate portion of said lateral member being other than straight, said frame having a notch to receive said lateral member when said grid wire is inserted while being held at an angle relative to assembled position and having a web to engage the intermediate portion of said lateral member when said grid wire is swung to assembled position, said frame having openings to receive the free ends of said arms to thereby anchor them.

9. In a toaster construction, a frame and a grid wire supported relative thereto, said grid wire being U-shaped and thereby having arms and a lateral member constituting a connecting member, said frame having a notch to receive said lateral member when said grid wire is inserted while being held at an angle relative to assembled position and having a portion to engage the intermediate portion of said lateral member when said grid wire is swung to assembled position, said frame having slots to receive the free ends of said arms, said arms being movable longitudinally of said slots and confined by them against movement laterally thereof and bread supports pivotally mounted and having portions spaced from their pivotal axes and engageable with said arms to move them in said slots and thereby retain said bread supports in desired positions.

10. In a toaster construction, a frame and a grid wire supported relative thereto, said grid wire being U-shaped, the central portion thereof being anchored to said frame, said frame having slots to receive the free ends of the arms of said grid wire extending from the central portion thereof, said arms being movable in said slots, said grid wire having a cam portion and a hinged bread support having an edge spaced from its hinge axis and slidable along said cam portion during swinging movement of the bread support to retain it in bread supporting position.

11. In a toaster construction, a frame, a grid wire having a portion anchored thereto, said frame having a slot, another portion of said grid wire being received therein and constrained to engage one end of said slot and a bread support hinged to said frame and having a portion spaced from the hinge axis thereof and engaging said grid wire to swing it toward the other end of said slot, said grid wire, in moving toward the first mentioned end of said slot, exerting a turning moment on said bread support to swing it toward bread supporting position.

PERCY O. DERRINGER.